United States Patent [19]
Kaehler et al.

[11] Patent Number: 6,092,410
[45] Date of Patent: Jul. 25, 2000

[54] METER CALIBRATION AND DRIFT COMPENSATION DEVICE

[75] Inventors: David L. Kaehler, Greensboro; Richard R. Sobota, Kernersville; Edward A. Payne, Greensboro, all of N.C.

[73] Assignee: Marconi Commerce Systems Inc., Greensboro, N.C.

[21] Appl. No.: 09/027,265

[22] Filed: Feb. 20, 1998

[51] Int. Cl.$^7$ .................................................. G01F 25/00
[52] U.S. Cl. ............................ 73/1.34; 73/1.27; 73/1.36; 702/100
[58] Field of Search ................... 73/1.27, 1.34, 73/1.36; 702/100

[56] References Cited

U.S. PATENT DOCUMENTS

| | | | |
|---|---|---|---|
| 3,610,898 | 10/1971 | Yamamoto et al. | 235/151.34 |
| 4,303,984 | 12/1981 | Houvig . | |
| 4,358,947 | 11/1982 | Greene et al. . | |
| 4,581,714 | 4/1986 | Reid . | |
| 4,581,946 | 4/1986 | Kanayama | 73/861.77 |
| 4,633,422 | 12/1986 | Brauer . | |
| 4,831,866 | 5/1989 | Forkert et al. . | |
| 4,885,943 | 12/1989 | Tootell et al. | 73/861.77 |
| 4,910,994 | 3/1990 | Lew | 73/1.34 |
| 5,003,810 | 4/1991 | Jepson et al. | 73/196 |
| 5,016,187 | 5/1991 | Forkert et al. | 73/861.77 X |
| 5,089,979 | 2/1992 | McEachern et al. . | |
| 5,153,837 | 10/1992 | Shaffer et al. . | |
| 5,251,149 | 10/1993 | Williams et al. | 73/861.77 X |
| 5,251,785 | 10/1993 | Hayden et al. | 222/1 |
| 5,285,673 | 2/1994 | Drexel et al. | 73/1.16 |
| 5,347,476 | 9/1994 | McBean, Sr. . | |
| 5,347,843 | 9/1994 | Orr et al. | 73/1.34 |
| 5,895,863 | 4/1999 | Glaadel et al. | 73/861.01 |

FOREIGN PATENT DOCUMENTS

WO 98/20307   5/1998   WIPO .
WO 98/20308   5/1998   WIPO .

*Primary Examiner*—Thomas P. Noland
*Attorney, Agent, or Firm*—Coats & Bennett, P.L.L.C.

[57] ABSTRACT

The present invention relates to a system and a method for compensating for predicted meter drift is a positive displacement meter comprising a pulser connected to the meter for generating a pulse stream indicative of a current volume delivered through the meter; and a pulse processor in electronic communication with the pulse generator. The pulse processor adds or subtracts pulses indicative of the inverse of the predicted meter drift to or from the pulse stream to create a corrected pulse stream. The amount of inverse applied is determined by the value of the current cumulative volume passed by the meter.

21 Claims, 8 Drawing Sheets

METER CALIBRATION AND DRIFT COMPENSATION DEVICE

BACKGROUND OF THE INVENTION

The present invention relates generally to precision liquid volume measurement devices and methods. More particularly, the invention relates to a device and method for se with a positive displacement metering device which can be expected to experience wear nd a resultant error during its operational life. The present invention is particularly uitable for gasoline dispensers.

Gasoline dispensers typically use positive displacement meters for precise volume measurement. These meters typically include various mechanical components which undergo wear during the life of the meter. This wear introduces an error from the meter's initial error-free calibration state. This error is referred to in the art as meter drift. The resulting loss of accuracy may cause a customer to be overcharged or a business to be credited improperly for the actual value of an individual transaction.

The meters are produced in volume to very exacting standards. Thus, each of a large number of meters can and does show a predictable wear pattern consistent with the others and will experience a similarly predictable error generation characteristic. The change in volumetric accuracy for a mass-produced positive displacement meter can and has been described as a function of the volume delivered over meter life.

Heretofore, this error has been addressed by periodic, manual meter calibrations using a calibration device called a "prover can." This type of calibration process requires human intervention to dispense a predetermined amount of liquid into the can and compare that amount to the meter's indication of the volume dispensed. A mechanical adjustment to the meter is then made to account for any error. Various weights and measures authorities require performance of this type test at regular intervals, usually on an annual basis. This type of meter calibration process is expensive and labor-intensive.

Previous attempts to incorporate a "prover can" type device into a gasoline dispenser housing are not satisfactory. An example is the system shown in U.S. Pat. No. 4,831,866 to Forkert et al. The system shown in that patent does not take advantage of the known body of information concerning meter wear and the resultant error.

Therefore, there is a need for a simple, low cost system which takes advantage of known positive displacement meter error to continuously correct meter output and compensate for a known and expected error rate.

SUMMARY OF THE INVENTION

The present invention compensates for changes in meter volumetric accuracy by employing the inverse of the average meter characteristic drift. This inverse function may either be stored electronically in memory in static form and indexed by volume delivered over meter life, or alternately may be derived dynamically in equation form as a function of volume delivered over meter life. The invention is electrically interposed between the pulser and dispenser electronics, with corrections to volumetric measurement being effected by insertion or deletion of calculated pulses to the pulse train originated by the pulser.

The present invention may also be adapted to provide the initial factory calibration of a new meter. In this embodiment the number of raw pulses detected during the delivery of a predetermined volume of product is compared to a true number of pulses that should be detected. If the raw number of pulses is less or more than the true number, than a corresponding number of pulses is added/deleted respectively to the pulse train delivered to the dispenser electronics.

The invention includes a pulser connected to the meter for generating a pulse stream indicative of a current volume delivered through the meter; and a pulse processor in electronic communication with the pulse generator for adding or subtracting pulses indicative of the inverse of the predicted meter drift to the pulse stream to create a corrected pulse stream, wherein the amount of inverse applied is determined by the value of the current cumulative volume passed by the meter. The present invention also includes a method for compensating for meter drift in a positive displacement meter which includes creating a predicted meter drift characteristic based on current cumulative volumes and storing the characteristic in an electronic storage device; generating a pulse stream correlated to the current volume measured by the meter; and modifying the pulse stream by the inverse of the predicted meter drift amount to create a corrected output signal. The predicted meter drift characteristic may be determined by an empirically-derived drift function residing in an electronic memory. Alternatively, a predicted cumulative meter drift amount may be taken from an electronic data table containing values of meter drift correlated to the cumulative volume.

The present invention is also directed to a liquid dispensing apparatus comprising a positive displacement meter having a predicted meter drift; a storage device containing data describing the predicted meter drift for a plurality of cumulative meter volume values; and a pulse generator connected to the meter for generating a pulse stream correlated to cumulative meter volume. The dispensing apparatus includes a pulse processor in electronic communication with the storage device for applying the inverse of the predicted meter drift to the pulse stream to create a corrected pulse stream. The amount of inverse applied is determined by the value of the current cumulative meter volume. There is also provided a sales transaction display displaying a number indicating a full purchase determined by the corrected pulse stream.

The present invention further provides a method for the manual calibration of a fuel dispenser having a positive displacement meter, and a pulser connected thereto for generating a pulse stream indicative of the volume dispensed through the meter. The method comprises dispensing a known quantity of fuel through the positive displacement meter and comparing the known quantity to a meter indicated quantity therefor. Any difference between the known quantity and the meter indicated quantity is a meter error. A processor is provided for receiving the pulse stream and applying the meter error thereto to generate a corrected pulse stream which does not include the meter error.

In one embodiment, the practice of the invention may supplant the initial mechanical calibration of the meter by implementing drift correction over meter life. An apparatus embodying the invention could be safeguarded to prevent illegal tampering/modification of algorithm or life index. Further the apparatus could be disposed should the meter be replaced.

In an alternate embodiment, the invention could replace the mechanical calibration and associated mechanical calibration components by allowing electronic or electro-optical access to the processor of the present invention via secure means. Authorized individuals could perform initial and subsequent meter calibrations, with separate, controlled access available to permit resetting the volume delivered index if the meter is replaced.

It should be understood that both the following general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

DETAILED DESCRIPTION OF THE INVENTION

Figure 1:
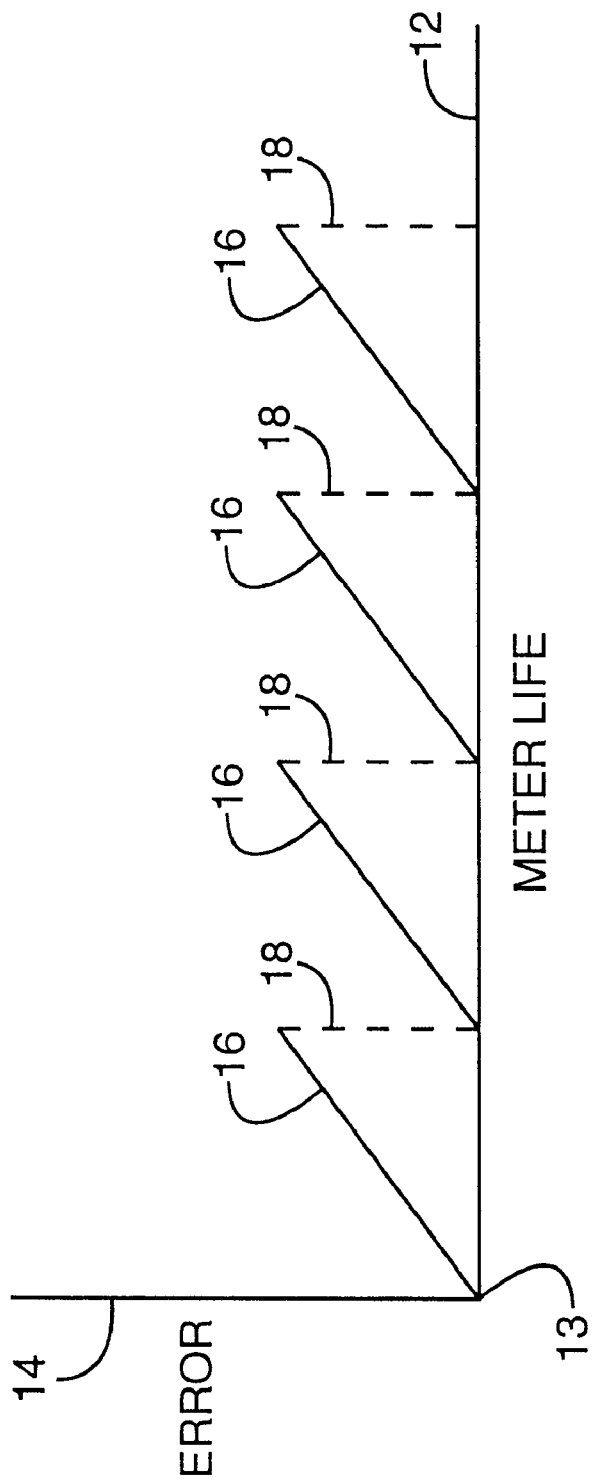
FIG. 1 is a graphical illustration of a manual meter calibration process.

Referring now to FIG. 1, there is shown a graphical representation of the compensated error over meter life of a typical manual meter subject to conventional calibration process. The horizontal axis 12 represents meter life in terms of gallons (or other similar unit) delivered through the meter. The vertical axis 14 represents the amount of meter error at any given time during meter life. Meter error 16 begins to build at the time of meter installation 13 and continues to grow until a manual calibration and correction 18 is applied to bring the meter error 16 back to zero. The meter correction 18 takes place at approximately equal intervals over the life of the meter. The two-step cycle of growing meter error 16, followed by meter correction 18 continues over the life of the meter. This graphical representation is not intended to depict any exact amount of meter error or the exact nature in which the meter error 16 develops over time. For example, the amount of error and the direction of that error may vary with each correction 18. Rather, the representation shows the process by which meter error is brought back to zero on a periodic basis. For the reasons discussed above, this process is expensive and inefficient.

Figure 2:
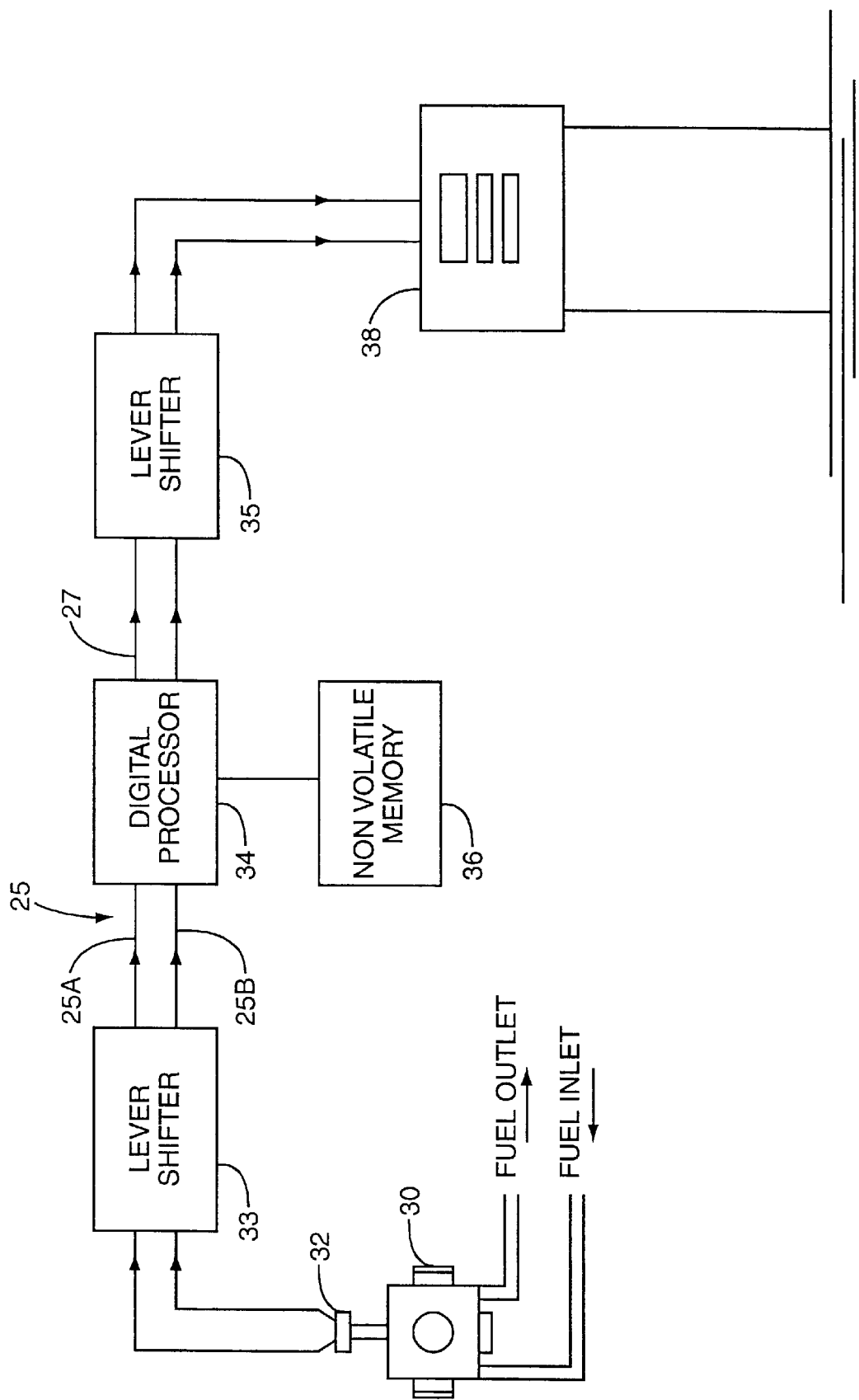
FIG. 2 is a schematic representation of the apparatus of a preferred embodiment of the present invention.

Turning now to FIG. 2, there is illustrated an embodiment of the present invention, which includes a conventional positive displacement meter 30 and a pulser 32 connected thereto for generating a pulse train 25 to processor 34. Non-volatile memory 36 is in electronic communication with processor 34. Current cumulative volume is either continuously or periodically written to non-volatile memory 36 so that it is preserved to a significant degree during electrical power loss. The term "current cumulative volume" refers to data indicative of the total volume of product that has been delivered through the meter at any given time after its installation. It will be readily understood that this term is conveniently stored as a running total of the amount of product that has passed through the meter such that the value of current cumulative volume will increase steadily over the life of the meter. Furthermore, checksums and other data management techniques may be employed to verify the accuracy of the stored volumetric index and other program data. Failure of these techniques to verify proper data storage would result in device shut-down and the generation of a pulser failure indication. Processor 34 generates an output signal 27 to dispenser electronics 38 which in this embodiment is conventional. A suitable processor 34 for the practice of the present invention is a Philips 87C748 or equivalent thereto. This processor should be understood to include an operating program permanently stored in a Read Only Memory (ROM). The processor may also store information temporarily in a Random Access Memory (RAM) on an as needed basis. The processor will employ a variety of well known components such as counters, registers, flags and indexes to generate current cumulative volume information, to store that information, to store an inverse meter drift function, and to access data maintained in a look up table of known meter drift data.

Pulser 32 is typically operated through a mechanical linkage to the meter 30 in conventional fashion. As is well known in the art, the number of pulses making up the pulse train 25 is directly proportional to the liquid volume flowing through positive displacement meter 30. In one aspect, the scope of the present invention includes managing a pulse train generated by any type of conventional pulser or any other device capable of generating a pulse train indicative of volume flow through a positive displacement meter.

In this example, the positive displacement meter 30 may be Gilbarco Part No. PA024 manufactured by Gilbarco, Inc., in Greensboro, N.C. This meter incorporates a pulser which could be one of Gilbarco Part Nos. T18350-G1, -G2, or -G3 also manufactured by Gilbarco, Inc. Each pulse represents a given amount of volume of fluid that is passed through the positive displacement meter 30.

As will be apparent to those of ordinary skill in the art, systems employing the principles of the present invention can be constructed in a variety of ways. By way of nonlimiting example, a look up table of known meter drift data could be maintained in processor RAM (with battery back up) or, alternatively, in non-volatile memory. Desirably, programmable non-volatile memory devices would be used as they retain information such as current cumulative volume during a power interruption. Desirable non-volatile memory types include electronically programmable read only memories (EPROM), erasable electronically programmable read only memories (EEPROM), ferro electric non-volatile memory devices flash memory devices, mask programmed read only memory (ROM), and one-time programmable electronically programmable read only memory (OTP EPROM). The practice of the present invention contemplates using these and any other suitable memory device.

Optionally, the present invention could also include level shifters 33, 35, before and after processor 34 for modifying the pulse train 25 and the output signal 27 voltage and/or power level as necessary for proper operation with a particular type of processor 34 or the electronics contained in dispenser 38. The need for the level shifters 33, 35 could be based on, for example, whether or not the device must accommodate the voltage and/or safety requirements of the United States or Europe.

Although two pulse signals 25a, 25b are shown as making up pulse train 25 a single pulse train is sufficient to convey volumetric information to practice the present invention. However, as will be familiar to one of ordinary skill in the art, two pulse signals are commonly used to indicate a pulser failure or pulser rotational direction.

Figure 3:
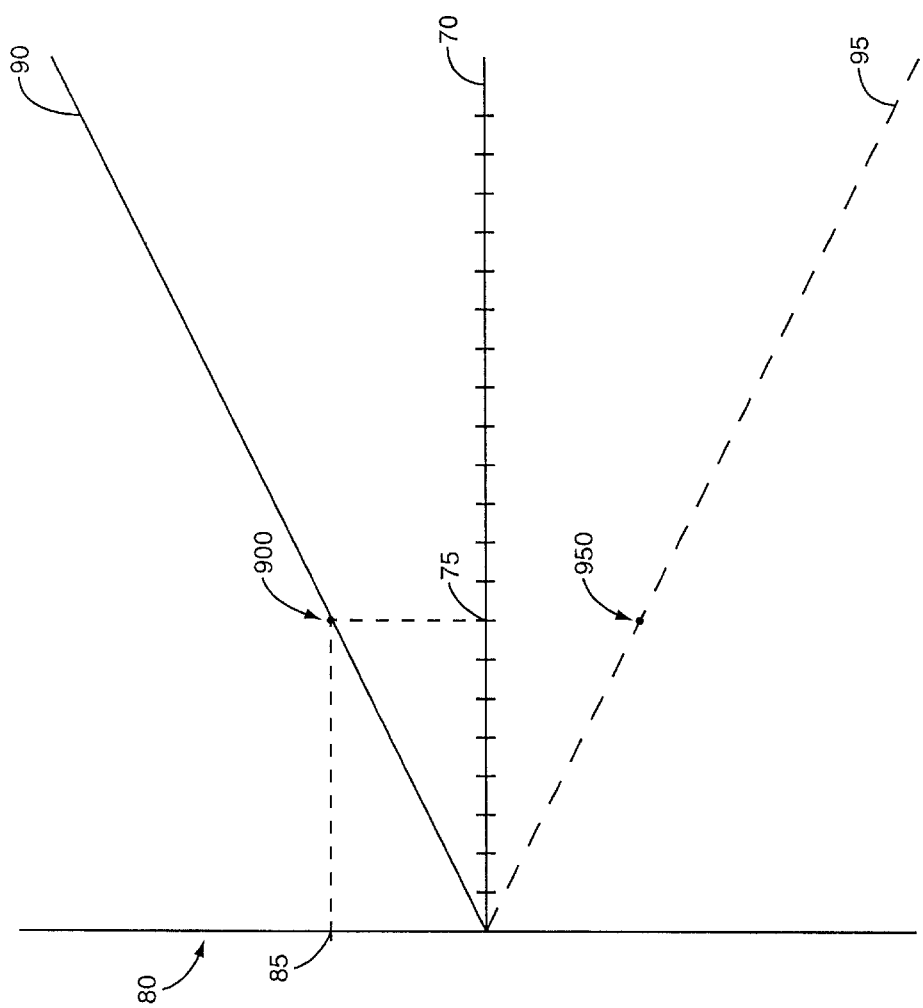
FIG. 3 is a graphical representation of meter drift which is evaluated to ascertain the needed compensation for the present invention.

The principle of meter error correction on which operation of the present invention is based will now be described with reference to FIG. 3. As was discussed above, mass-produced, positive displacement meters exhibit characteristic wear patterns over their useful lives. These wear patterns generate an error referred to as meter drift, the magnitude and direction of which can be reliably predicted. FIG. 3 is a graphical representation of this phenomena. Horizontal axis 70 represents meter life in terms of current cumulative volume. Vertical axis 80 represents both the direction and quantity of meter drift at any point during meter life. Curve 90 represents a predicted meter drift characteristic over the course of a meter's useful life. It should be noted that FIG. 3 is not intended to show the exact magnitude, sign or scale of the drift that will be experienced by any particular meter. Rather, the curve shows that, typically, the amount of meter error increases by some amount over the life of the meter. Although the curve shown in FIG. 3 is a straight line, the actual meter drift may actually follow a curve. In fact, it has been observed that for the first few hundred gallons dispensed through a meter, meter error or drift curve may curve upwardly in one direction and then downwardly in the opposite direction before settling out in a long term curve. This long term curve can be modeled with sufficient accuracy by a straight line approximation. Dotted curve 95 is a "mirror image" inverse of predicted meter drift 90. That is, each point 950 on dotted line 95 is of equal magnitude but opposite sign of the corresponding point 900 on curve 90 for that point on the horizontal meter life axis 70.

As will be readily apparent, both the predicted meter drift characteristic 90 and the inverse 95 may be expressed in terms of a mathematical function having an input as a particular point along horizontal axis 70 and an output of vertical displacement on vertical axis 80. Alternatively, both curves may be described as a collection of points with each point described in x,y coordinate fashion by a certain current cumulative volume 75 along horizontal axis 70 and a corresponding meter error 85 on vertical axis 80. Simply stated, the present invention electronically applies the inverse curve 95 to predicted meter drift 90 throughout meter life.

The function represented by curve 90 is empirically derived based on test data taken from a large population of a particular meter model. As will be apparent to one of ordinary skill in the art, an empirically-derived function can be determined readily by a meter manufacturer using existing data and experience with that manufacturer's product line. The function will vary from one meter design to another. This function may be contained in a computer program executed by a Central Processing Unit ("CPU"), located in memory accessible by processor 34. Alternatively, correction values may be stored in a look up table maintained in the memory of the CPU or in non-volatile memory 36. Processor 34 then either adds or subtracts a precise number of pulses at calculated intervals dependent upon the cumulative volume dispensed over the meter's life and then generates output signals 27 containing the modified pulse count.

Figure 4A:
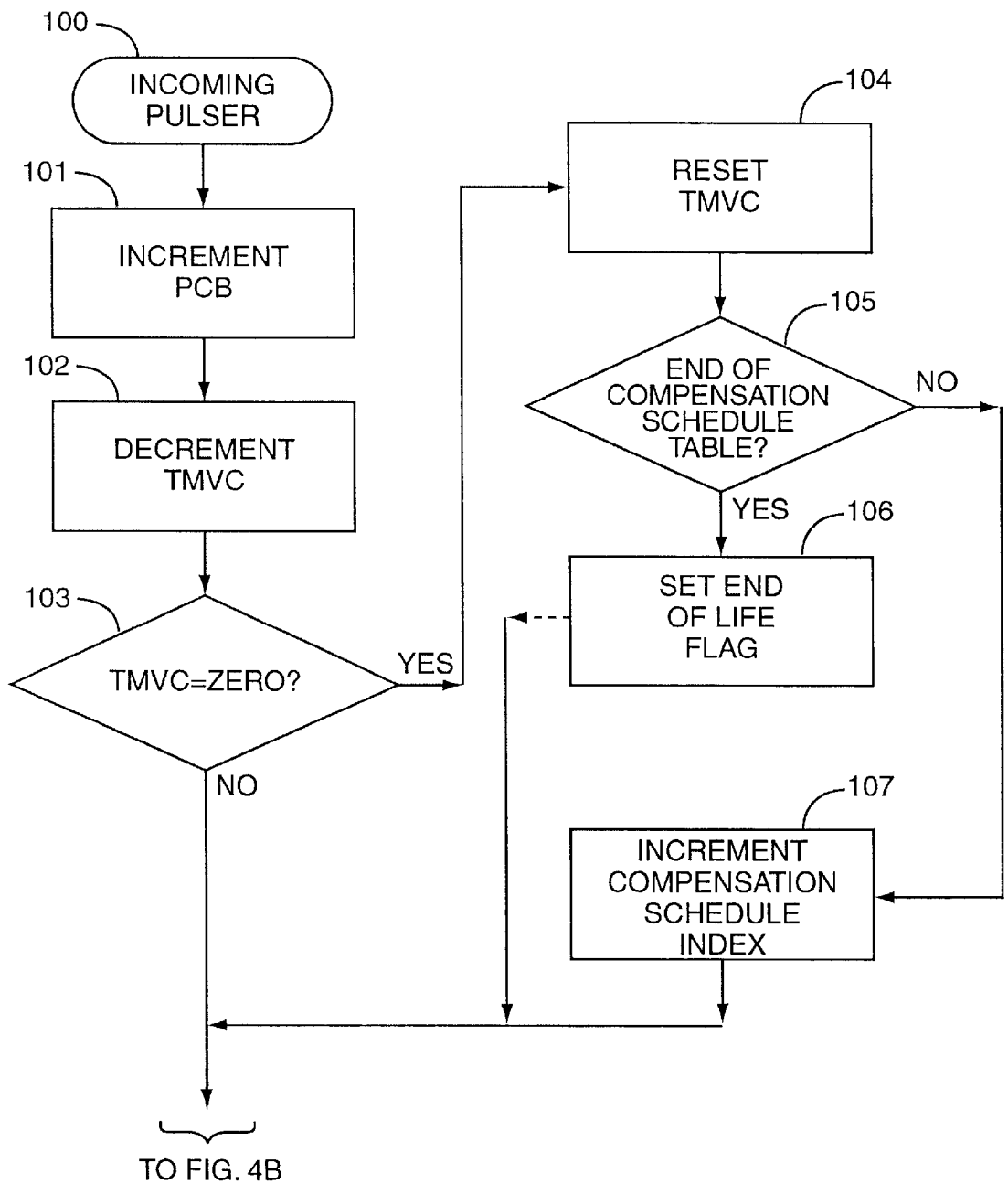
FIGS. 4A–4C are flow charts illustrating the operation of the present invention.
Figure 4B:
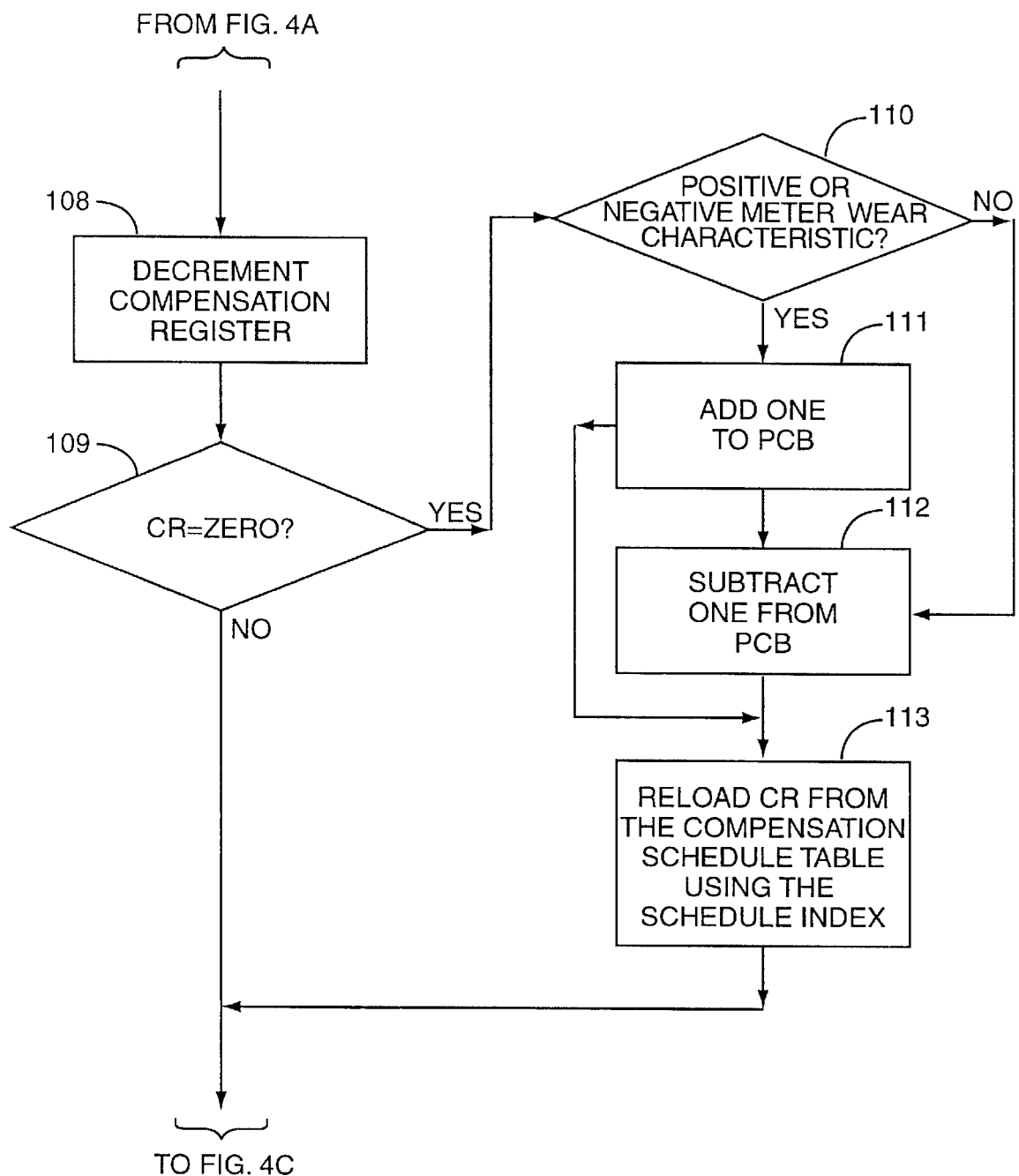
Figure 4C:
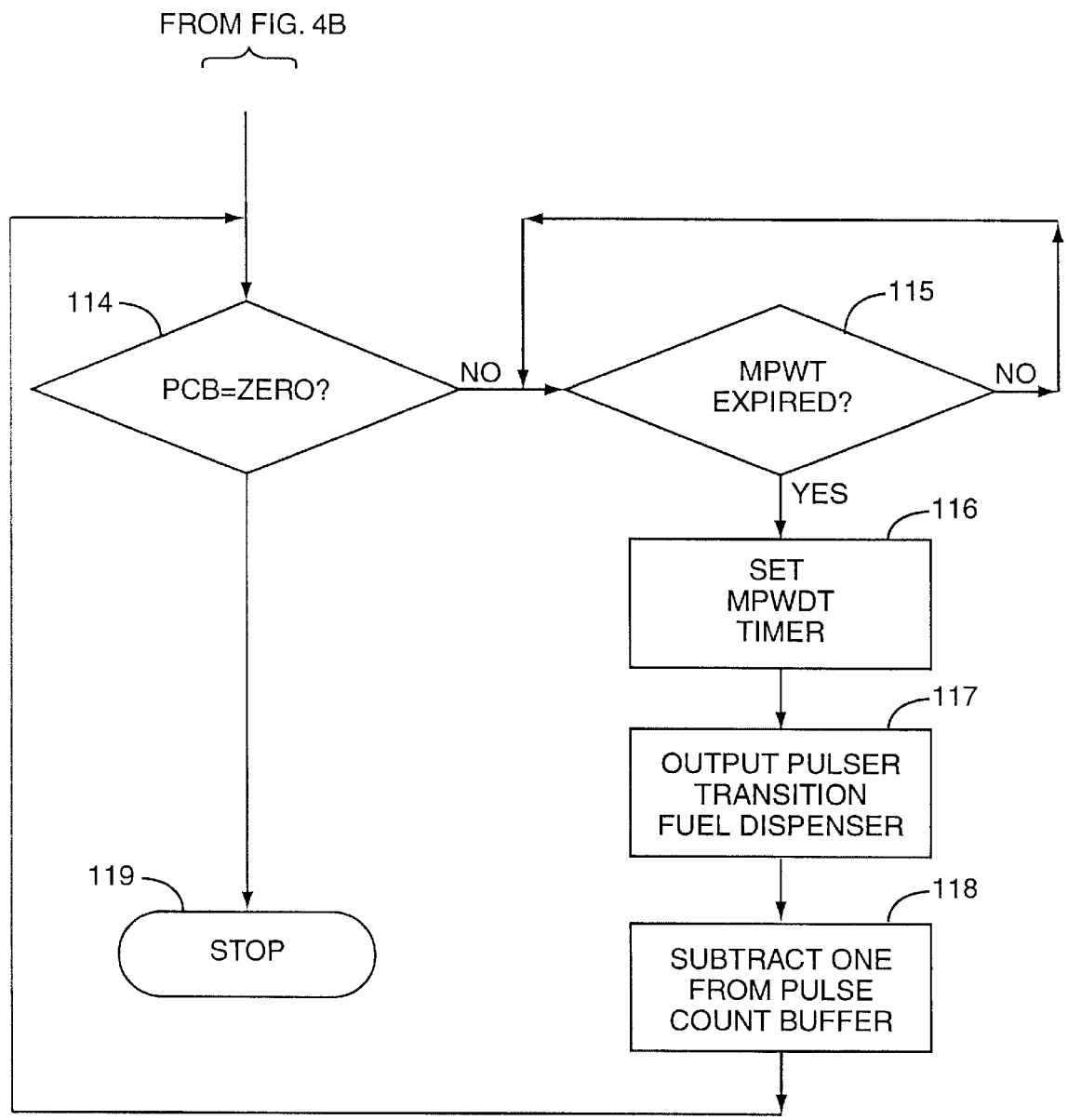

The steps for one approach to this signal modification are illustrated in the flow chart shown in FIGS. 4A–4C with the processor 34 (FIG. 2) suitably programmed to carry out the operations of the flow chart. Those of ordinary skill in the programming arts can write the code needed to carry out the flow chart. Some of the terms used in the flow chart are defined below:

"Pulse Count Buffer" (PCB) means a memory location whose function is to store an incoming pulse transition temporarily until the routines describe below can be run to determine what meter correction or calibration, if any, will be applied thereto. The value of the PCB will be either 0 or 1.

"Total Meter Volume Counter" (TMVC) refers to an electronic counter used to track meter life. In a preferred embodiment, this counter is set initially at the number of gallons (or other units such as liters) that the meter is expected to deliver between calibration table steps. This counter is decremented in steps until it reaches a value of zero indicating the need to index the next compensation value. Upon exhaustion of the last compensation table value, the end of life flag is set. It will be readily apparent that the counter count be set up in alternative ways to accomplish the same function. In effect, this counter serves as a final totalizer to record the current cumulative volume delivered through the meter while the table index serves as a coarse counter.

"Meter Compensation Schedule Table" refers to a stored table used in conjunction with the TMVC to determine when end of meter life is reached.

"Compensation Schedule Index" refers to an electronic counter used to monitor the number of gallons delivered between changes to the correction amount applied to incoming pulse stream 25. Stated another way, it determines when a change is made from one point on the horizontal axis in FIG. 3 to the next point to the right on that axis. If a change to the meter correction amount is to be made every 10,000 gallons delivered in a meter having a life of 1,000,000 gallons, then this index will be incremented up or down 100 times.

"Compensation Register" means a stored set of meter error 90 or meter correction 95 values, the value of which at any given time depends on a point selected on the horizontal axis (or meter life) of FIG. 3. The value of the Compensation Schedule Index will determine the value taken form the Compensation Register. In the practice of the present invention the meter error value 90 could be selected, its sign changed and applied to the pulse stream 25. Alternatively, the positive of the meter correction could be applied directly to the pulse stream 25.

"Minimum Pulse Width Delay Time (MPDWT)" refers to the minimum amount of time required for a pulse transition. MPDWT must be tracked to ensure that pulses are inserted/deleted at the appropriate point in the incoming pulse stream 25. Without a timer to perform this monitoring function, pulses could be inserted randomly creating a distorted pulse stream that would not be recognized by the dispenser electronics. MPWDT is monitored by a timer which works in conjunction with the PCB.

"Calibration Register" means a counter which is decremented to zero providing the interval at which corrective calibration pulses are inserted/deleted as appropriate. Upon reaching zero, the calibration register is reloaded with the calibration value.

The flow charts illustrate a non-limiting hypothetical example wherein the present invention will be used for a meter having a meter life of one million gallons. Moreover, it is also assumed that a look up table has been prepared having a series of points 75 along the horizontal axis as illustrated in FIG. 3, with each of the correction points 75 occurring every ten thousand gallons. That is, after every ten thousand gallons a new meter correction value 85 will be used to modify the pulse train 25. Thus the table will contain 1,000,000/10,000 or 100 data points. It should be appreciated that a smaller interval could be selected if an extremely precise correction value is desired. However, that increase in precision will come at the cost of increased memory requirements.

Entering the flow chart of FIG. 4A at 100, a pulse transition from pulser 32 first increments a pulse count buffer (PCB) 101. The PCB 101 may be located in the Random Access Memory (RAM) of the CPU. Next a Total Meter Volume Counter 102 (TMVC) is decremented. The purpose of the TMVC 102 is to count down the selected number of gallons selected to increment the meter drift characteristic during meter life. In this example the counter will count down from 10,000 to zero. The TMVC 102 may be located in non-volatile memory 36 or in the RAM of the CPU. Next test 103 determines whether the decremented TMVC value is equal to 0. If test 103 answers yes, then the routine goes to 104 where the TMVC value is reset to 10,000. Next test 105 determines whether the end of the meter compensation schedule table for the particular meter has been reached. If the end has been reached, then an end of life flag 106 is set and the then current correction value will be used for the remainder of the time that the meter is left in service. If the end of the meter compensation schedule table has not been reached, then the compensation schedule index is incremented at 107. In effect, this step moves the correction factor to the next point along the horizontal axis as shown in FIG. 3.

Turning to FIG. 4B, a compensation register (CR) 108 is decremented. Next test 109 determines whether the CR is equal to 0. If equal to 0, test 110 queries whether a positive or negative meter wear characteristic should be applied to the incoming pulse train 25. Accordingly, an appropriate number of pulses will be either added 111 or subtracted 112 from the PCB. After either of those outcomes the CR 108 is reloaded from the compensation schedule table using the compensation schedule index.

If test 109 answers no, then in FIG. 4C test 114 checks the condition of the PCB. If the PCB is not equal to 0 then a routine is entered which ensures that the required pulse modification is timed properly. In that routine test 115 determines whether a Minimum Pulse Width Delay Time (MPWDT) has expired. This test will be continued if a negative answer is encountered until a proper delay has been reached. At that time test 115 moves the routine to 116 where the MPWDT timer is set. Next, a modified pulse is output 117 to the fuel dispenser. When that output is complete, 1 is subtracted from the PCB at 118 and the process returns to test 114. If the PCB value equals 0 then the process stops at 119.

Figure 4D:
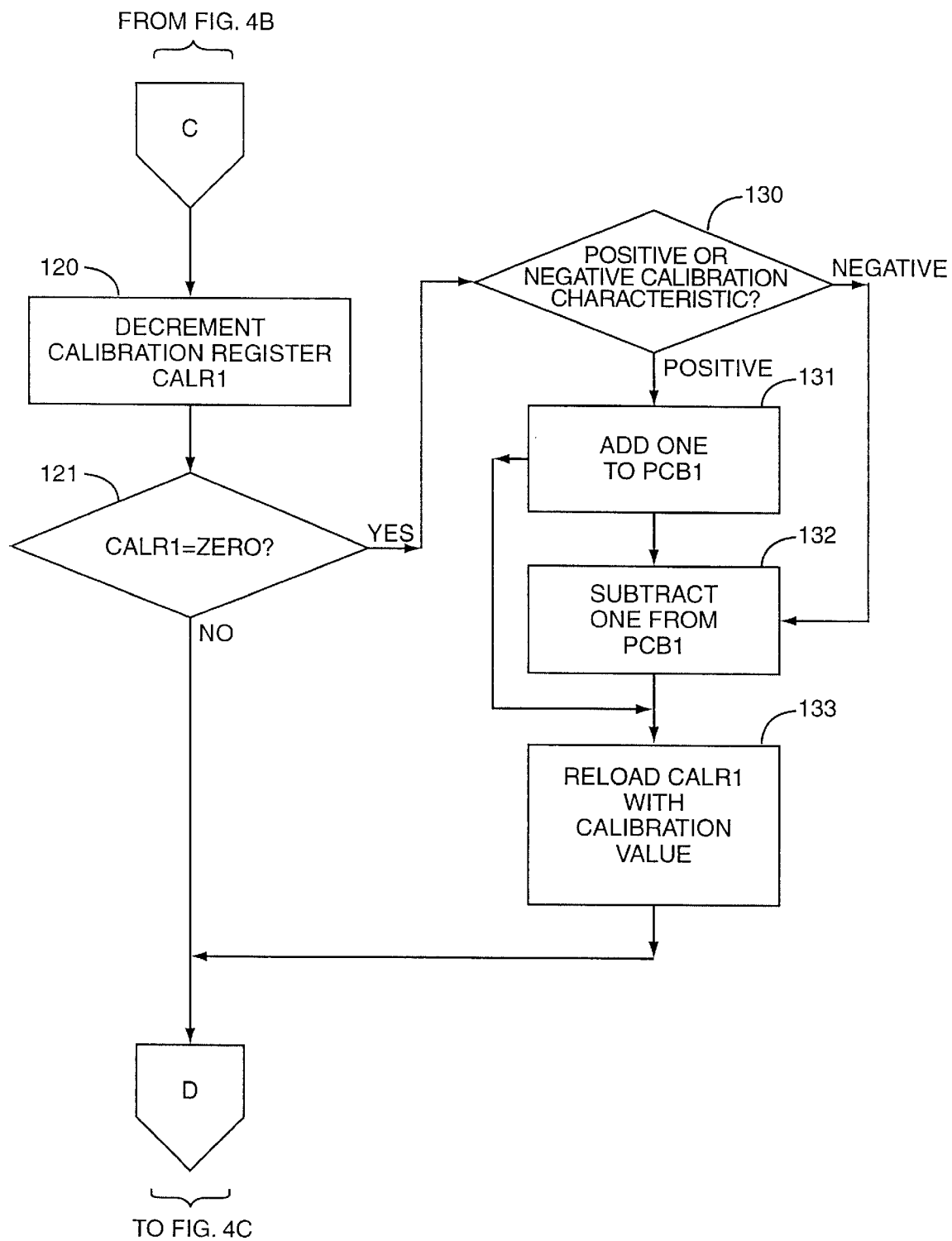
FIG. 4D illustrates the operation of an alternative embodiment of the present invention used to perform in electronic fashion the initial factory calibration of a meter.

In an alternative embodiment, the present invention may be used to perform the initial factory calibration of a meter. This method is described in FIG. 4D which has as its entry point the exit point of FIG. 4B. From either test 109 or block 113, the routine proceeds to decrement Calibration Register (CALR) 120. Next, test 121 asks if CALR equals zero. If yes, then test 130 asks whether a positive or negative calibration characteristic will be applied. If positive, one is added to PCB 131; if negative, one is subtracted from PCB 132. Then the CALR is reloaded with a Calibration Value (CALV) 133. CALV is representative of the number of inputted pulser pulses, e.g. meter displacement, that must occur before a corrective calibration pulse is inserted/deleted, to ensure that the modified pulse stream 27 accurately represents the volume delivered through the meter. If test 120 answers no, then the method proceeds to 114 at the entry point of FIG. 4C. To illustrate this embodiment assume that one meter pulse transition is intended to represent precisely 1/1000th of a gallon of product flow through the meter. Next, a bench test is conducted which shows that actually 999 raw pulser pulses are produced while passing exactly one calibrated gallon of fuel through the meter. Thus, CALV would be set to 999, similarly the Calibration Characteristic (CALC) would be set positive (block 130), thereby adding one pulse to PCB1 (block 131), effectively producing a calibrated system by now outputting exactly 1000 pulses for each exact gallon through the meter.

Next assume that the bench testing shows that 1001 raw pulser pulses actually are produced while passing exactly one calibrated gallon of fuel through the meter. In this case, the CALV would be set to 1001 and, in similar fashion to that describe above, the CALC would be set as a negative decrement (block 130), thereby subtracting one pulse to PCB1 (block 132). The end result is to produce the desired 1000 pulses for each exact gallon through the meter.

Access to, the setting and/or modification of the CALV may be achieved by various means, including, but not limited to switches, keypads or buttons; also serial or parallel data steam via direct connection, RF, or optical methods such as visible or infrared. Importantly, access to the CALV must be protected to prevent fraud, to insure access only by authorized parties, or to flag tampering. This may be accomplished by physical seal installed on processor 34, incorporating some type of password protection for access, or using any well known data encryption method.

It should be noted that if a meter must be replaced prior to the end of its service life, the practice of the present invention may include resetting the indexes and registers described above to a point that correlates with the replacement meter's history. Assuming that the same model of meter is installed, there would be no need to update the stored meter drift function/look up table. However, changing that information for a different meter model is a straightforward step within the ability of one of ordinary skill in the art.

Figure 5:
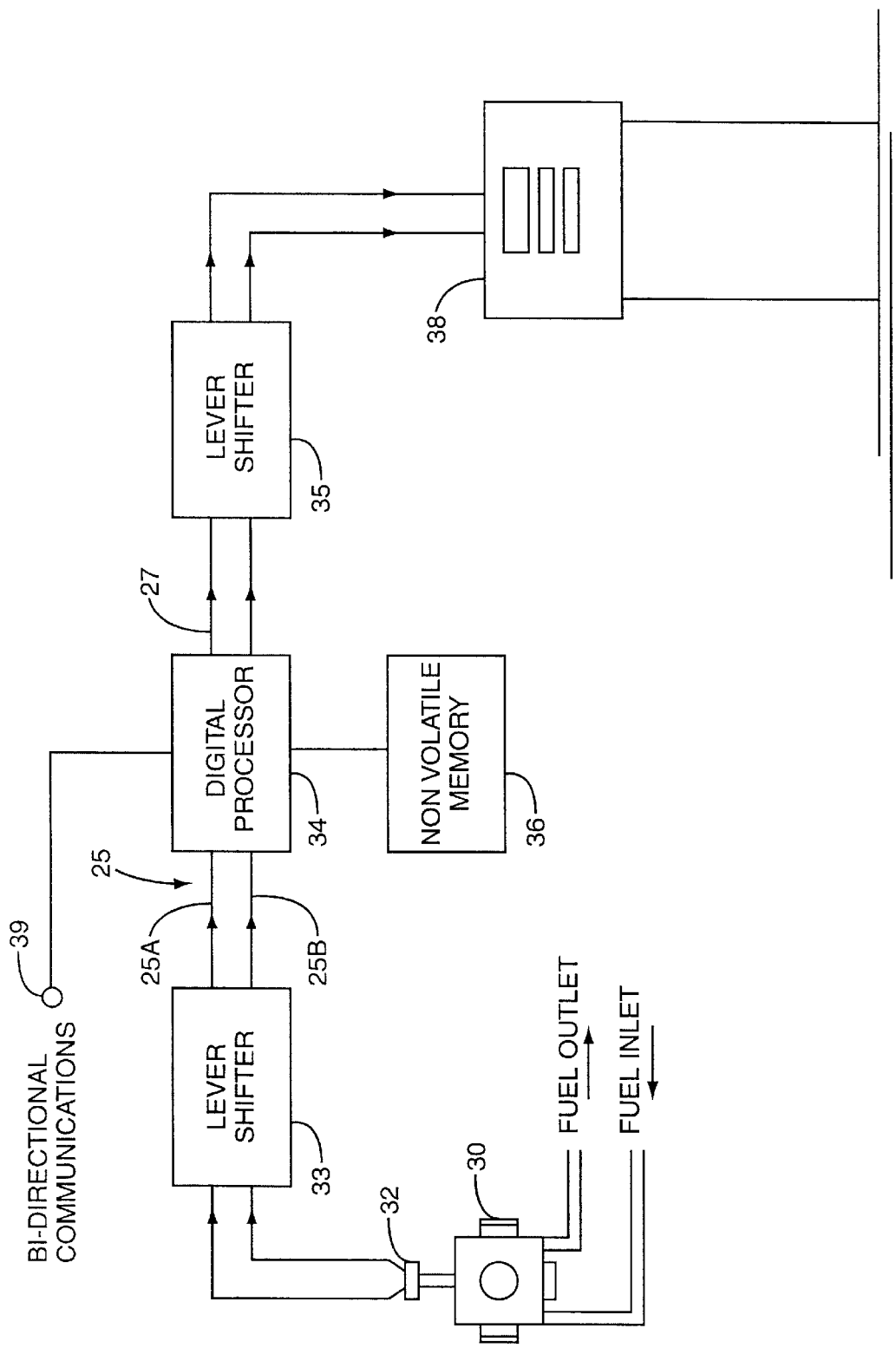
FIG. 5 is a schematic representation of an alternative embodiment of the present invention.

In an alternative embodiment shown in FIG. 5, there is a provision for manual meter calibration to be accomplished by the present invention without the use of a mechanical adjusting device. These conventional devices typically take the form of well known dashpots, which are used to modify the physical displacement of the meter and thus change the number of pulses generated per unit volume of liquid passing through the meter. The present invention provides for the same effect to be achieved by electronic modification of the pulse stream exiting pulser 32. This embodiment includes communications port 39 which is in communication with the processor 34. After using a prover can as described above to determine manually the amount of correction to be applied to a meter, that amount of correction is communicated electronically to processor 34 which then adds or subtracts pulses as necessary. As with any manual calibration process, processor 34 will output a constant correction to pulse stream irrespective of meter wear until the next manual calibration operation using the prover can. Preferably, a small hand held device will be electrically connected to processor 34 via port 39 to input the required correction.

However, for gasoline dispensing applications, current safety regulations establish a zone around a gasoline dispenser hydraulic piping in which special measures must be taken to avoid fires or explosions. These electrical code requirements may preclude a standard electrical connector from being used in close proximity to a gasoline dispenser meter. Accordingly, alternate communications devices such as an infrared, inductive or RF device may be used. Preferably, an electro-optical device such as a Light Emitting Diode (LED) is preferred as a cost-effective means to attach a prior-energized device to meter electronics. In this method, the digital data stream going into and exiting processor 34 would be represented by a series of LED light flashes. This stream of data may be communicated via a fiber optic cable to the hand-held device, where it is read. Thus the connection between the hand held device and the meter electronics would be a physical rather than an electronic one and much less likely to create a potentially dangerous spark. It will be appreciated that ownership of such devices would have to be closely regulated to prevent unauthorized tampering with the output of processor 34. Therefore, either a sufficiently complex password or a mechanical seal on the processor communications connection would be employed to address the potential for such tampering.

In an alternative manual calibration embodiment, each processor 34 of a multiple meter installation may be accessed remotely from a central location via a hard wired connection thereto. The advantage of this approach lies in the ease with which a number of meters may be calibrated. Also the electronic calibration permits very precise corrections to be made to pulse stream 25.

The embodiments of the invention discussed thus far each modify pulse stream 25 by adding or subtracting pulses as needed based on the cumulative volume dispensed through the meter. However, other approaches may be used. For example, the correction for meter drift may be applied to the total quantity of a transaction using a multiplier correction factor. For each of the points along the x-axis in FIG. 3 a multiplier factor rather than an absolute error quantity would be stored in memory. Thus, if a total of 10 gallons of product is dispensed, then a multiplier factor corresponding to the then current cumulative volume would be multiplied by 10 to determine the corrected quantity of fuel dispensed. This approach may use a one time correction to that quantity after product flow has stopped. Preferably, the total quantity dispensed would be corrected on a real time basis as fuel is dispensed. One way to carry out this alternative requires that the total amount of fuel dispensed ("$Q_D$") be stored periodically in a first memory location. $Q_D$ is then multiplied by the multiplication factor to create a corrected quantity ("$Q_C$") which is stored in a second memory location. Next an updated value of $Q_D$ is stored to the first memory location replacing the old value. The new $Q_D$ is then corrected and stored in the second memory location replacing the old value of $Q_C$. These steps are repeated throughout the fueling process and can be accomplished sufficiently rapidly to ensure that a corrected dispensed quantity is always displayed to the customer. The sign of the multiplier factor is not believed critical as the factor will have a value of less than 1 if fewer pulses are needed and a value of more than 1 if more pulses are needed. Although it does not add or subtract pulses to/from pulse stream 25 directly, this embodiment employs the basic teachings of the present invention as described above.

It should be understood that although the components of the present invention have been shown as separate from other gasoline dispenser electronics, they may be incorporated into gasoline dispenser electronics.

The electronic meter calibration and drift compensation device described herein employs digital electronic techniques. However one of ordinary skill in the art could likewise employ a variety of digital, software, or mechanical embodiments to achieve similar results.

Although the present invention as being described with preferred embodiments, it is to be understood that modifications and variations may be utilized without departing from the spirit and scope of this invention, as those of skill in the art will readily understand. Such modifications and variations are considered to be within the purview and scope of the appended claims and their equivalents.

What is claimed is:

1. An apparatus for compensating for predicted meter drift in a positive displacement meter comprising:
  a) a pulser connected to the meter for generating a pulse stream indicative of a current volume delivered through the meter; and
  b) a pulse processor in electronic communication with the pulse generator for altering the number of pulses in the pulse stream with correction pulses indicative of the inverse of the predicted meter drift to create a corrected pulse stream,
  wherein the amount of inverse applied at any given time is determined by the value of the current cumulative volume dispensed by the meter.

2. The apparatus of claim 1 wherein the inverse of the predicted meter drift is an empirically-derived function, wherein the function has an input of a current cumulative volume value and an output of the predicted meter drift corresponding to that value.

3. The apparatus of claim 1 wherein the inverse of the predicted meter drift is comprised of stored meter error values maintained in a storage device in electronic communication with the pulse processor.

4. The apparatus of claim 3 wherein the storage device further includes a current value of the cumulative volume.

5. The apparatus of claim 1 further comprising a remote communications port in electronic communication with the processor for remote monitoring of processor operation.

6. The apparatus of claim 5 wherein the remote communications port is an electro-optical device.

7. An apparatus for compensating for predicted meter drift in a positive displacement meter comprising:
  a) a pulser connected to the meter for generating a pulse stream indicative of a current volume delivered through the meter;
  b) a storage device for storing a current cumulative volume amount and data describing the predicted meter drift corresponding to the current cumulative volume amount; and
  c) a processor operatively connected to the pulser and the storage device for retrieving the predicted meter drift and applying an inverse thereof to the pulse stream to create a corrected signal, wherein the amount of inverse applied is determined by the value of the current cumulative volume.

8. The apparatus of claim 7 wherein the inverse of the predicted meter drift is an empirically-derived function having as an input current cumulative volume amount and as an output the inverse of the predicted meter drift for current cumulative volume.

9. The apparatus of claim 7 wherein the inverse of the predicted meter drift is taken from a database of drift correction values, each value correlated to a cumulative volume amount delivered through the meter.

10. A method of compensating for meter drift in a positive displacement meter comprising:
  a) creating a predicted meter drift characteristic based on current cumulative volumes and storing the characteristic in an electronic storage device;
  b) generating a pulse stream correlated to the current volume measured by the meter;

c) modifying the pulse stream by the inverse of the predicted meter drift amount to create a corrected output signal.

11. The method of claim 10 wherein the predicted meter drift characteristic is determined by an empirically-derived drift function residing in an electronic memory.

12. The method of claim 10 wherein the predicted cumulative meter drift amount is taken from an electronic data table containing values of meter drift correlated to the cumulative volume.

13. A method for compensating for meter drift in a positive displacement meter comprising:
   a) storing in an electronic storage device known drift data describing an expected amount of meter error wherein the drift data is correlated to the cumulative volume delivered through the meter;
   b) monitoring the cumulative volume delivered through the meter; and
   c) correcting meter output by applying the inverse of the drift data to the meter output based on the cumulative volume.

14. The method of claim 13 wherein in step a) the inverse of the known drift data is stored in an electronic storage device and in step c) correcting meter output is conducted by applying the inverse data directly from electronic storage.

15. A method for compensating for meter drift in a positive displacement meter comprising:
   a) storing a known meter drift function in computer memory;
   b) monitoring the cumulative volume delivered through the meter; and
   c) correcting meter output by applying the inverse of the drift function to the meter output based on the cumulative volume.

16. The method of claim 15 wherein in step a) an inverse of a known meter drift function is stored in computer memory and in step c) correcting meter output is accomplished by applying the inverse function directly to the meter output.

17. A liquid dispensing apparatus comprising:
   a) a positive displacement meter having a predicted meter drift;
   b) a storage device containing data describing the predicted meter drift for a plurality of cumulative meter volume values;
   c) a pulse generator connected to the meter for generating a pulse stream correlated to cumulative meter volume;
   d) a pulse processor in electronic communication with the storage device for applying the inverse of the predicted meter drift to the pulse stream to create a corrected pulse stream, the amount of inverse applied being determined by the value of the current cumulative meter volume; and
   e) a sales transaction display displaying a number indicating a full purchase determined by the corrected pulse stream.

18. An apparatus for compensating for predicted meter drift in a positive displacement meter comprising:
   a) a pulser connected to the meter for generating a pulse stream indicative of a current volume delivered through the meter; and
   b) a processor in electronic communication win the pulse generator for altering the number of pulses in the pulse stream in an amount equal to the inverse of the predicted meter drift to create a corrected pulse stream, wherein the amount of pulse stream alteration applied at any given time is determined by the value of the current cumulative volume dispensed by the meter.

19. The apparatus of claim 18 wherein the pulse processor alters the number of pulses in the pulse stream for a quantity of product dispensed through the meter by multiplying the quantity dispensed by a correction factor, the correction factor determined by the value of the current cumulative volume dispensed by the meter.

20. The apparatus of claim 18 wherein the processor alters the number of pulses in the pulse stream using an empirically-derived function representative of the inverse of the predicted meter drift, wherein the function has an input of a current cumulative volume value and an output of the predicted meter drift corresponding to that value.

21. The apparatus of claim 18 wherein the processor alters the number of pulses in the pulse stream using the inverse of the predicted meter drift comprised of stored meter error values maintained in a storage device in electronic communication with the pulse processor.

* * * * *